(12) United States Patent
Cai et al.

(10) Patent No.: US 11,963,094 B2
(45) Date of Patent: Apr. 16, 2024

(54) NETWORK SLICE SELECTION IN A NETWORK BASED ON USE CASE

(71) Applicant: Nokia Technologies Oy, Espoo (FI)

(72) Inventors: Yigang Cai, Naperville, IL (US); Padma Sudarsan, Naperville, IL (US); Volker Ziegler, Munich (DE)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 17/601,761

(22) PCT Filed: Apr. 11, 2019

(86) PCT No.: PCT/US2019/027023
§ 371 (c)(1),
(2) Date: Oct. 6, 2021

(87) PCT Pub. No.: WO2020/209861
PCT Pub. Date: Oct. 15, 2020

(65) Prior Publication Data
US 2022/0201601 A1    Jun. 23, 2022

(51) Int. Cl.
*H04W 16/04* (2009.01)
*H04M 15/00* (2006.01)
*H04W 8/18* (2009.01)
*H04W 24/02* (2009.01)
*H04W 48/18* (2009.01)

(52) U.S. Cl.
CPC ........... *H04W 48/18* (2013.01); *H04M 15/66* (2013.01); *H04W 8/183* (2013.01)

(58) Field of Classification Search
None
See application file for complete search history.

(56) References Cited

U.S. PATENT DOCUMENTS

2017/0303259 A1    10/2017    Lee et al.

FOREIGN PATENT DOCUMENTS

| CN | 109565746 A | 10/2021 | |
|----|----|----|----|
| CN | 108432185 A | 8/2022 | |
| WO | WO-2017044153 A1 * | 3/2017 | ........... G06F 9/5077 |
| WO | 2018134483 A1 | 7/2018 | |
| WO | 2018233808 A1 | 12/2018 | |

OTHER PUBLICATIONS

Chinese office action; Application 201980095264; Feb. 7, 2024.
Office Action Search Report; Application 2019800952640.

* cited by examiner

*Primary Examiner* — Gary Lafontant
(74) *Attorney, Agent, or Firm* — Duft & Bornsen, PC

(57) ABSTRACT

Systems, methods, and software for selecting a network slice for User Equipment (UE) based on a use case specified by the UE. In one embodiment, a slicing policy manager is implemented in a network that is partitioned into a plurality of network slices. The slicing policy manager receives a policy request for the UE, identifies a use case identifier in the policy request that indicates a use case specified by the UE, generates a use case slice selection policy configured to select a network slice from the plurality of network slices based on the use case specified by the UE, and initiates transmission of the use case slice selection policy to a slice selection manager. The slice selection manager may then select a network slice for the UE based on the policy.

20 Claims, 9 Drawing Sheets

NETWORK SLICE SELECTION IN A NETWORK BASED ON USE CASE

RELATED APPLICATIONS

The present application is a National Stage entry of PCT application No. PCT/US2019/027023 filed on Apr. 11, 2019, which is fully incorporated herein by reference.

TECHNICAL FIELD

This disclosure relates to the field of communication systems and, in particular, to next generation networks.

BACKGROUND

Next generation networks, such as Fifth Generation (5G), denote the next major phase of mobile telecommunications standards beyond the current Fourth Generation (4G) standards. In comparison to 4G networks, next generation networks may be enhanced in terms of radio access and network architecture. Next generation networks intend to utilize new regions of the radio spectrum for Radio Access Networks (RANs), such as centimeter and millimeter wave bands. Also, the architecture of next generation networks has the functional elements of the user plane separated from the control plane. With Software-Defined Networking (SDN) and Network Functions Virtualization (NFV) supporting an underlying physical architecture, functional elements may be defined on the physical architecture to provide network functions. It is envisioned that next generation networks will utilize the concept to network slicing, where a physical network is partitioned into multiple virtual networks that offer optimal support for different types of services. It is therefore desirable to identify effective ways of managing network slicing.

SUMMARY

Embodiments described herein are directed to network slicing based on use cases. Next generation networks will support new services for a multitude of use cases and devices. The types of devices that will access services from next generation networks may not be limited to traditional phones, but may include wearables, vehicles, industrial components (e.g., robots), appliances, etc. New use cases and services will place different requirements on the network in terms of functionality, and their performance requirements may vary enormously. For example, an autonomous car may use V2X (vehicle-to-anything) communications, which requires low latency but not necessarily a high throughput. A streaming service watched while the autonomous car is in motion requires a high throughput and is susceptible to latency. The embodiments described herein set forth a mechanism for selecting network slices that are tailored toward specific use cases. Thus, the network selects network slices that are optimized for specific use cases requested by a UE.

One embodiment comprises a slicing policy manager implemented in a network that provides one or more services to a UE. The network is partitioned into a plurality of network slices. The slicing policy manager comprises one or more processors and memory that cause the slicing policy manager to receive a policy request for the UE, identify a use case identifier in the policy request that indicates a use case specified by the UE, generate a use case slice selection policy configured to select a network slice from the plurality of network slices based on the use case specified by the UE, and initiate transmission of the use case slice selection policy to a slice selection manager.

In another embodiment, processor and memory cause the slicing policy manager to retrieve a subscriber profile for the UE, and process the subscriber profile to identify a network slicing matrix provisioned for the UE. The network slicing matrix maps one or more use cases authorized for the UE to one or more of the plurality of network slices that accommodate performance requirements of the one or more use cases. The slicing policy manager generates the use case slice selection policy based on the use case and the network slicing matrix.

In another embodiment, the processor and memory cause the slicing policy manager to identify the network slices in the network slicing matrix that are mapped to the use case specified by the UE, and provision slice selection criteria for the network slices that are mapped to the use case specified by the UE to generate the use case slice selection policy.

In another embodiment, for each use case of the one or more use cases, the network slicing matrix maps the use case to one or more applications. The network slicing matrix further maps one or more of the plurality of network slices to each of the applications.

In another embodiment, a processor and memory cause the slice selection manager to receive the use case slice selection policy from the slicing policy manager, to select a network slice for the UE from the plurality of network slices based on the use case slice selection policy, and to initiate transmission of a network slice identifier for the selected network slice to the UE.

In another embodiment, the slicing policy manager is implemented at a Policy Control Function (PCF), and the slice selection manager is implemented at a Network Slice Selection Function (NSSF).

In another embodiment, circuitry causes the UE to insert the use case identifier in a registration request sent to the network.

Another embodiment comprises a method of operating a network that is partitioned into a plurality of network slices. The method comprises receiving a policy request for the UE at a slicing policy manager, identifying a use case identifier in the policy request that indicates a use case specified by the UE, generating a use case slice selection policy configured to select a network slice from the plurality of network slices based on the use case specified by the UE, and initiating transmission of the use case slice selection policy from the slicing policy manager to a slice selection manager.

In another embodiment, the method further comprises retrieving a subscriber profile for the UE, and processing the subscriber profile to identify a network slicing matrix provisioned for the UE. The network slicing matrix maps one or more use cases authorized for the UE to one or more of the plurality of network slices that accommodate performance requirements of the one or more use cases. The method further comprises generating the use case slice selection policy based on the use case and the network slicing matrix.

In another embodiment, the method comprises identifying the network slices in the network slicing matrix that are mapped to the use case specified by the UE, and provisioning slice selection criteria for the network slices that are mapped to the use case specified by the UE to generate the use case slice selection policy.

In another embodiment, the method further comprises receiving the use case slice selection policy from the slicing policy manager at the slice selection manager, selecting a network slice for the UE from the plurality of network slices based on the use case slice selection policy, and initiating transmission of a network slice identifier for the selected network slice from the slice selection manager to the UE.

In another embodiment, the method further comprises inserting, at the UE, the use case identifier in a registration request sent to the network.

Another embodiment comprises a slicing policy manager implemented in a network that is partitioned into a plurality of network slices. The slicing policy manager comprises a means for receiving a policy request for the UE, a means for identifying a use case identifier in the policy request that indicates a use case specified by the UE, a means for generating a use case slice selection policy configured to select a network slice from the plurality of network slices based on the use case specified by the UE, and a means for initiating transmission of the use case slice selection policy to a slice selection manager.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
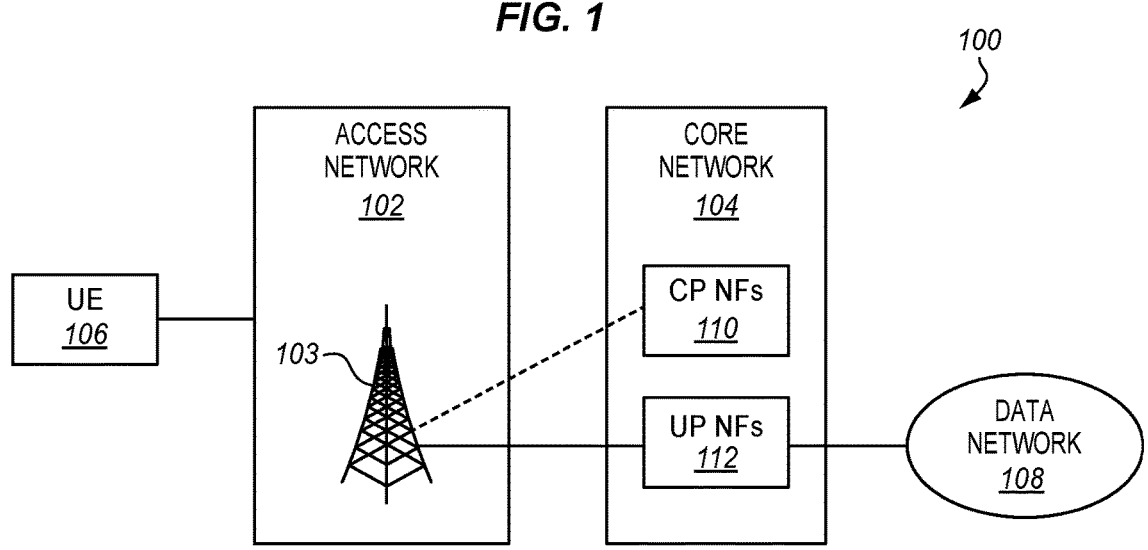
FIG. 1 illustrates a high-level architecture of a 5G system in an illustrative embodiment.

FIG. 1 illustrates a high-level architecture of a 5G system 100 in an illustrative embodiment. A 5G system 100 is a communication system (e.g., a 3GPP system) comprising a 5G Access Network (AN) 102, 5G Core Network (CN) 104, and a UE 106. Access network 102 may comprise a NG-RAN and/or non-3GPP AN connecting to a 5G core network 104. Access network 102 may support Evolved-UMTS Terrestrial Radio Access Network (E-UTRAN) access (e.g., through an eNodeB, gNodeB, and/or ng-eNodeB 103), Wireless Local Area Network (WLAN) access, fixed access, satellite radio access, new Radio Access Technologies (RAT), etc. Core network 104 interconnects access network 102 with a data network (DN) 108. Core network 104 is comprised of Network Functions (NF), which may be implemented either as a network element on dedicated hardware, as a software instance running on dedicated hardware, or as a virtualized function instantiated on an appropriate platform (e.g., a cloud infrastructure). The network functions for the control plane (e.g., CP NF 110) are separated from network functions for the user plane (e.g., UP NF 112). Data network 108 may be an operator external public or private data network, or an intra-operator data network (e.g., for IMS services). UE 106 is configured to register with core network 104 to access services. UE 106 is an end device or terminal that is configured to support multiple use cases. UE 106 may comprise a phone, a wearable, or another type of machine, such as a collaborative automated robot.

Figure 2:
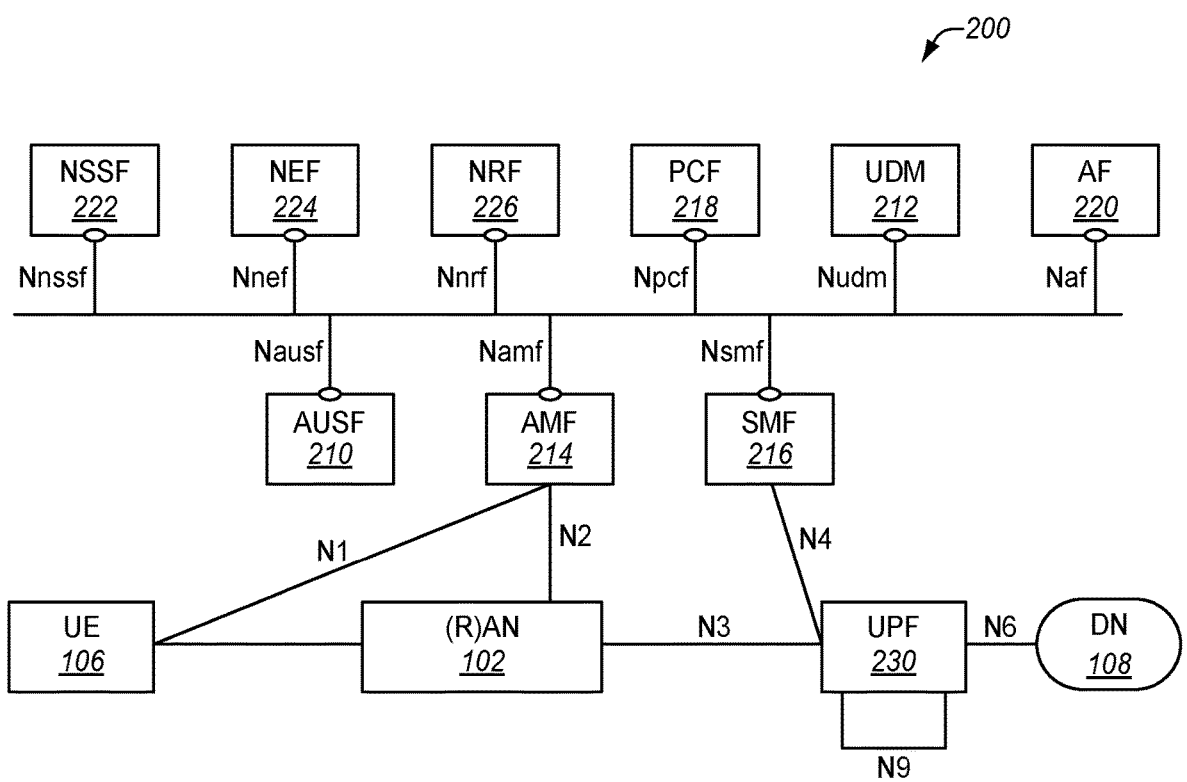
FIG. 2 illustrates a non-roaming architecture of a 5G system.

FIG. 2 illustrates a non-roaming architecture 200 of a 5G system, such as 5G system 100. The architecture in FIG. 2 is a service-based representation, as is further described in 3GPP TS 23.501 (v15.4.0), which is incorporated by reference as if fully included herein. In this representation, network functions (e.g., AMF) within the control plane enables other authorized network functions to access their services. The control plane of core network 104 (see FIG. 1) includes an Authentication Server Function (AUSF) 210, a Unified Data Management (UDM) 212, an Access and Mobility Management Function (AMF) 214, a Session Management Function (SMF) 216, a Policy Control Function (PCF) 218, an Application Function (AF) 220, a Network Slice Selection Function (NSSF) 222, a Network Exposure Function (NEF) 224, and a Network Repository Function (NRF) 226. The user plane of core network 104 includes one or more User Plane Functions (UPF) 230 that communicate with data network (DN) 108. UE 106 is able to access the control plane and the user plane of core network 104 through (R)AN 102.

AUSF 210 is configured to support authentication of UE 106. UDM 212 is configured to store subscription data/ information for UE 106. UDM 212 may store three types of user data: subscription, policy, and session-related context (e.g., UE location). AMF 214 is configured to provide UE-based authentication, authorization, mobility management, etc. SMF 216 is configured to provide the following functionality: session management (SM), UE Internet Protocol (IP) address allocation and management, selection and control of UPF(s), termination of interfaces towards PCF 218, control part of policy enforcement and Quality of Service (QoS), lawful intercept, termination of service management (SM) parts of NAS messages, Downlink Data Notification, roaming functionality, etc. If UE 106 has multiple sessions, different SMFs may be allocated to each session to manage them individually and possibly provide different functionalities per session. PCF 218 is configured to support a unified policy framework to govern network behavior, and to provide policy rules to control plane functions to enforce them. AF 220 interacts with network functions in order to provide services. NEF 224 supports external exposure of capabilities of network functions. NRF 226 maintains a profile for network functions. UPF 230 supports various user plane operations and functionalities, such as packet routing and forwarding, traffic handling (e.g., QoS enforcement), an anchor point for Intra-RAT/Inter-RAT mobility (when applicable), packet inspection and policy rule enforcement, lawful intercept (UP collection), traffic accounting and reporting, etc. Data network 108 is not part of core network 104, and provides Internet access, operator services, 3rd party services, etc.

AMF 214, SMF 216, PCF 218, UPF 230, etc., of 5G system 100 are also referred to herein as "elements" or "network elements". An "element" includes functions, operations, etc., and the underlying hardware or physical devices (e.g., processors) that are programmed to perform the functions.

Figure 3:
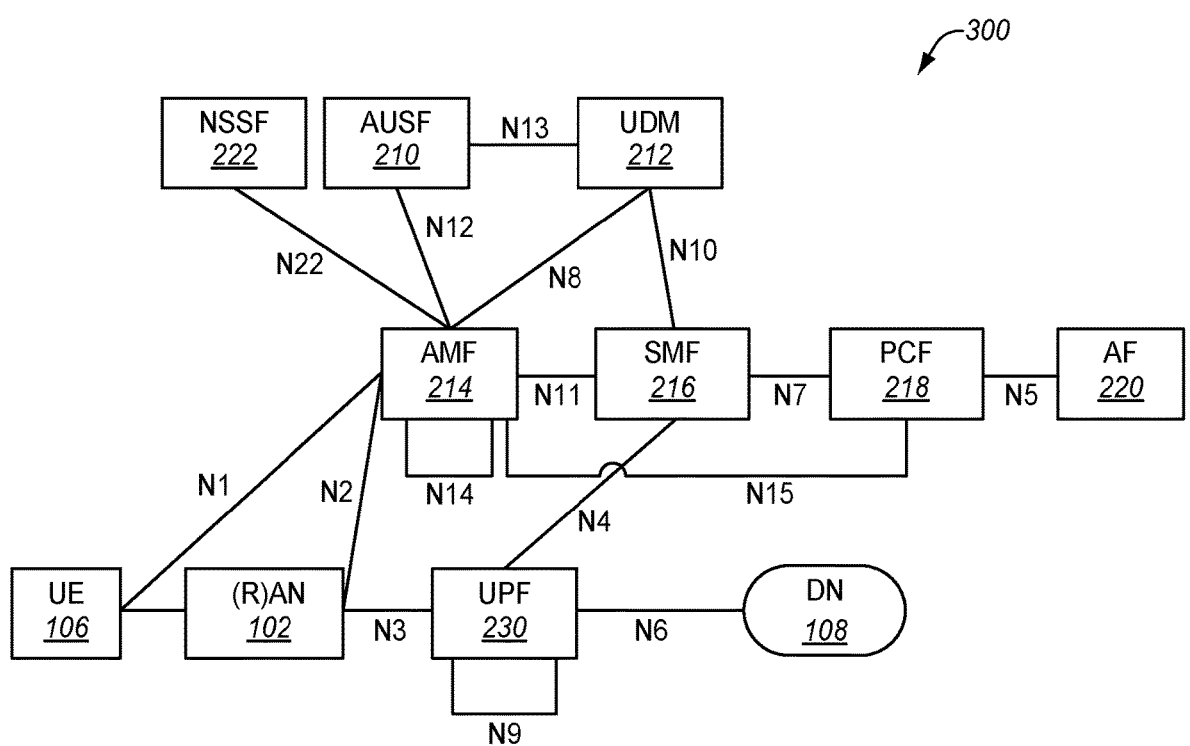
FIG. 3 further illustrates a non-roaming architecture of a 5G system.

FIG. 3 further illustrates a non-roaming architecture 300 of a 5G system, such as 5G system 100. The architecture in FIG. 3 is a reference point representation, as is further described in 3GPP TS 23.501. Architecture 300 includes the following reference points. The N1 reference point is implemented between UE 106 and AMF 214. The N2 reference point is implemented between (R)AN 102 and AMF 214. The N3 reference point is implemented between (R)AN 102 and UPF 230. The N4 reference point is implemented between the SMF 216 and UPF 230. The N5 reference point is implemented between PCF 218 and AF 220. The N6 reference point is implemented between UPF 230 and data network 108. The N7 reference point is implemented between the SMF 216 and PCF 218. The N8 reference point is implemented between UDM 212 and AMF 214. The N9 reference point is implemented between two UPFs 230. The N10 reference point is implemented between UDM 212 and SMF 216. The N11 reference point is implemented between AMF 214 and SMF 216. The N12 reference point is implemented between AMF 214 and AUSF 210. The N13 reference point is implemented between UDM 212 and AUSF 210. The N14 reference point is implemented between two AMFs. The N15 reference point is implemented between PCF 218 and AMF 214 in the case of a non-roaming scenario. The N22 reference point is implemented between NSSF 222 and AMF 214.

One goal of next generation networks (e.g., 5G) is to enable network slicing for core network 104. A network slice is a logical network that provides specific network capabilities and network characteristics. With network slicing, a physical network (e.g., a PLMN) may be partitioned into multiple virtual instances so that a mobile operator can offer support for different types of services for different types of customer segments. For example, a network slice may be comprised of control plane network functions (CP NF) and user plane network functions (UP NF) that are optimized for a variety of characteristics, such as latency, bandwidth, etc. One benefit of network slicing to operators is the ability to deploy only the functions and associated performance attributes needed to support particular customers and particular market segments. Additional functionality not needed for the particular customer or market segment need not be deployed. This results directly in savings compared to being required to deploy full functionality to support a variety of services and customers, and allows for the networks to be deployed more quickly because fewer functions need to be deployed.

Figure 4:
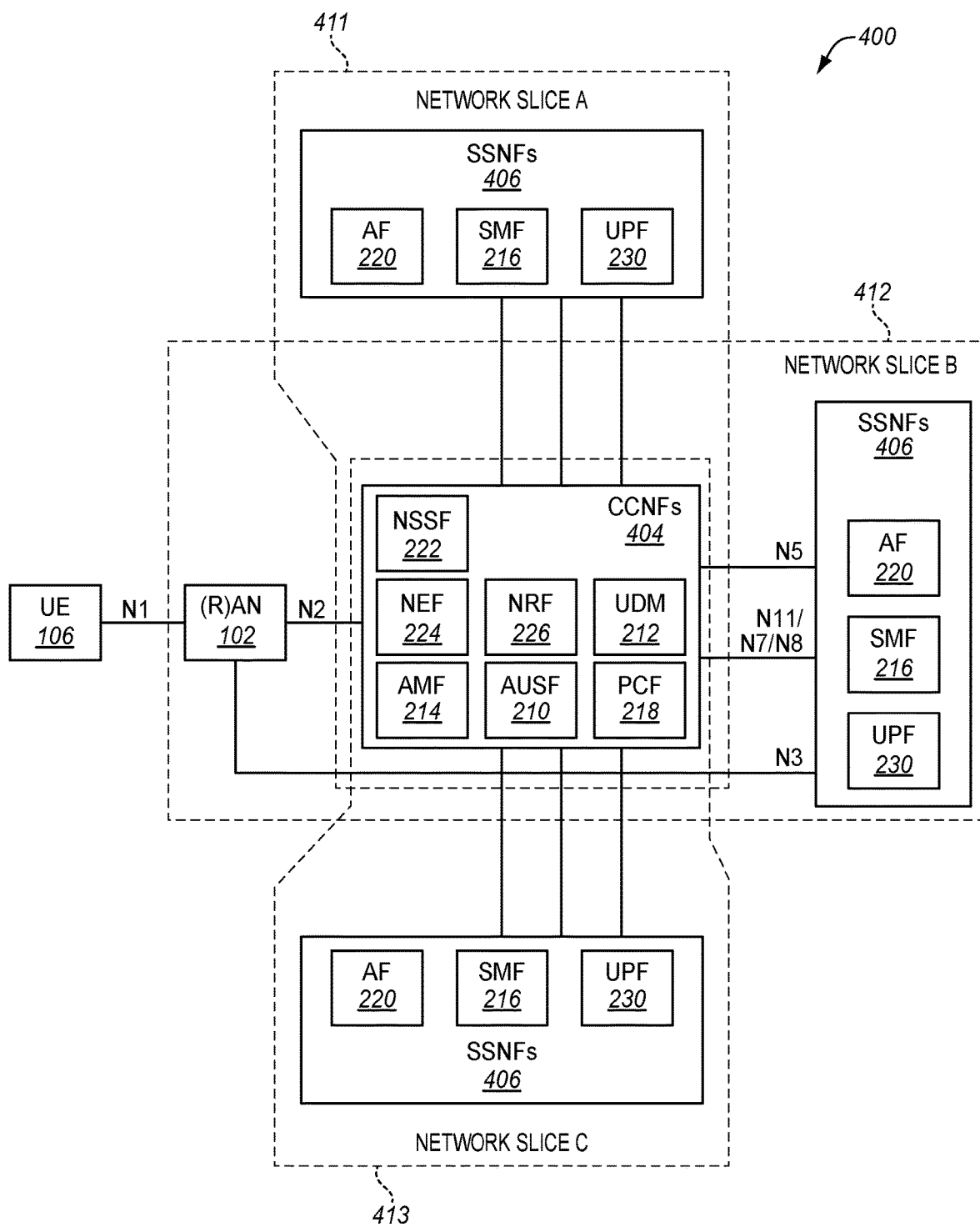
FIG. 4 illustrates a network slicing architecture.

FIG. 4 illustrates a network slicing architecture 400. In this architecture, the network functions are partitioned into Common Control Plane Network Functions (CCNF) 404 and Slice-Specific Network Functions 406. CCNFs 404 are shared among different network slices, and may include AUSF 210, UDM 212, AMF 214, PCF 218, NEF 224, NRF 226, and NSSF 222. SSNFs 406 are allocated to a particular network slice, and are not shared among different network slices. The network functions that are allocated to a particular network slice are configured to support a particular set of functionalities. SSNFs 406 include Control Plane Network Functions (CP NF), such as AF 220 and SMF 216, and User Plane Network Functions (UP NF), such as UPFs 230.

In FIG. 4, core network 104 is partitioned into three network slices: network slice A 411, network slice B 412, and network slice C 413. Each network slice 411, 412, and 413 is associated with a network slice identifier, which is a numerical value, string, or other information that identifies a network slice. For example, a network slice identifier may be referred to as Single-Network Slice Selection Assistance Information (S-NSSAI). According to the 3GPP, the NSSAI is a collection of S-NSSAIs, with up to eight S-NSSAIs in the NSSAI sent in control messages between a UE and the network. The S-NSSAI signaled by the UE to the network assists the network in selecting a particular network slice instance. An S-NSSAI is comprised of a Slice/Service Type (SST), which refers to the expected network slice behavior in terms of features and services, and a Slice Differentiator (SD), which is optional information that complements the SST to differentiate amongst multiple network slices of the same SST. An operator may deploy multiple network slice instances delivering the same features but for different groups of UEs, in which case the network slices may have different S-NSSAIs with the same SST but different SDs.

The International Telecommunication Union (ITU) has classified 5G mobile network services into three categories: Enhanced Mobile Broadband (eMBB), Ultra-reliable and Low-Latency Communications (uRLLC), and Massive Machine Type Communications (mMTC) or Massive Internet of Things (MIoT). eMBB focuses on services that have high bandwidth requirements, such as High-Definition (HD) videos, Virtual Reality (VR), and Augmented Reality (AR). uRLLC focuses on latency-sensitive services, such as automated driving and remote management. mMTC and MIoT focus on services that include high requirements for connection density, such as smart city and smart agriculture. Presently, the SSTs for network slicing is standardized into three values (see Table 5.15.2.2-1 of TS 23.501): SST value "1" for eMBB, SST value "2" for uRLLC, and SST value "3" for mMTC/MIoT.

Although network slicing has been proposed for 5G networks, the proposal is limited to differentiating between three categories of network services (i.e., eMBB, uRLLC, and MIoT). However, there may be many different use cases for 5G systems, and the three categories of network services may not be sufficient for network slicing. In the embodiments described herein, use cases shape how network slices are configured, and selected for UEs. A "use case" is a collection of applications that delivers an end-to-end (e2e) user experience, enterprise process optimization, services, etc. For example, use cases for a device in a vehicle may include pre-crash sensing, vehicle and road warnings, and Infotainment. An application refers to software used to provide a singular functionality for a use case. Each use case may be mapped to performance requirements. Performance requirements for use cases are multi-dimensional characteristics that are required to meet the user experience that use a specific situation in which a product or service could potentially be used. Performance requirements may include mobility, throughput, massive scale, latency, reliability, flexibility, service life cycle, operability, security, etc. The mobility requirement may include a mobility classification (e.g., high, medium, low, none, etc.), a mobility type (e.g., nomadic, public transport, pedestrian, vehicles, etc.), coverage (e.g., indoors, outdoors, both), deployment (e.g., venue, wide area, highway, etc.), and/or other parameters. The throughput requirement may include a throughput classification (e.g., average, medium, medium high, high, etc.), direction (downlink (DL) or uplink (UL)), and/or other parameters. The massive scale requirement may include a number of devices, density, and/or other parameters. The latency requirement may include a latency classification (e.g., very low, low, average, etc.), a maximum e2e time or threshold (e.g., milliseconds), and/or other parameters. The reliability requirement may include a reliability classification (e.g., low, average, high, very high, etc.), a maximum e2e time or threshold (e.g., milliseconds), and/or other parameters. Table 1 provides an example of use cases and performance requirements for the use cases.

Going beyond three-dimensional mapping by SST as was previously proposed, Table 1 depicts a mapping of use cases with performance requirements. In Table 1, one set of performance requirements maps to one or multiple verticals ("sample vertical"). One vertical maps to one or multiple use cases ("sample use case"). A use case may include one or several applications. For example, the use case of "motion control" as part of "industry automation" may include applications such as "robotic arm control" and "location of asset control" for overall production robot. Table 1 gives a sense of multiple use cases in different verticals and/or applications that may have the same set of performance requirements. New devices will keep appearing in the ecosystem to meet verticals and use cases requirements.

Because network slicing is a central part of next generation networks, there is a benefit in adapting network slicing characteristics based on needs of the use cases and applications. Enabling network resources to be managed dynamically gives both operators and application owners the flexibility and control to meet the needs of a specific use case. When network slices are orchestrated for particular use cases, the embodiments described herein allow for selection of a particular network slice. It may be assumed that different use cases may use the same type of network slice. Thus, there may not be a one-to-one mapping of network slices to use cases. To assist in selection of a network slice for a particular use case, network slicing matrices may be defined in the network. A network slicing matrix is a data structure that maps one or more use cases to one or more network slices. In generating the network slicing matrices,

TABLE 1

| No. | Performance requirements | Sample Verticals | Sample use cases |
|---|---|---|---|
| 1 | Very low latency, very high reliability | Industry automation | Factory industrial process automation and motion control |
|   |   | CV2X | Pre-crash sensing |
|   |   |   | Vehicle platooning |
|   |   | Air-to-ground | Drones |
| 2 | Low latency, average Tput and reliability | Industry automation | Collaborative automated robots |
|   |   |   | Factory floor critical sensors |
| 3 | Very low latency, low mobility | Industry automation | Factory floor static collaborative cloud robotics |
| 4 | Average latency, med-high Tput UL/DL, limited/no mobility | Industry automation | Co-present mixed reality |
|   |   |   | AR video/cloud based |
|   |   |   | Outdoor static surveillance |
|   |   | Tele-operation | Remote control |
|   |   | Smart city | Cloud gaming |
| 5 | Average latency, high mobility, LTE-like Tput | Industry automation | Remote crane control |
|   |   |   | Container tracking |
|   |   | CV2X | Vehicle and road warnings |
| 6 | Low latency, high DL Tput, med-high reliability, high mobility | CV2X/Infotainment | Vehicle Infotainment— Railroad and Bus |
|   |   |   | Vehicle Infotainment—Car rental |
| 7 | Low latency, high UL Tput, high reliability, low mobility | Video surveillance/ ubiquitous AR | Outdoor static surveillance |
|   |   |   | Outdoor static video surveillance |
| 8 | Average latency, high UL/DL Tput, high reliability, medium mobility | Video surveillance/ ubiquitous AR | Video first responder connectivity |
| 9 | Low latency, high UL Tput, very high reliability, high mobility | Video surveillance/ ubiquitous AR | Mobile video surveillance |
|   |   |   | Remote control drone-based mobile video surveillance |
| 10 | Average latency, low UL/DL Tput, high reliability, low mobility | Smart city | mMTC/IoT/smart city | the performance requirements for individual use cases are determined, and the use cases are mapped to one or more network slices that accommodate the performance requirements. Each use case may therefore be mapped to one or multiple network slices. One network slice may support one or multiple use cases, and each use case may be composed of multiple applications.

Figure 5:
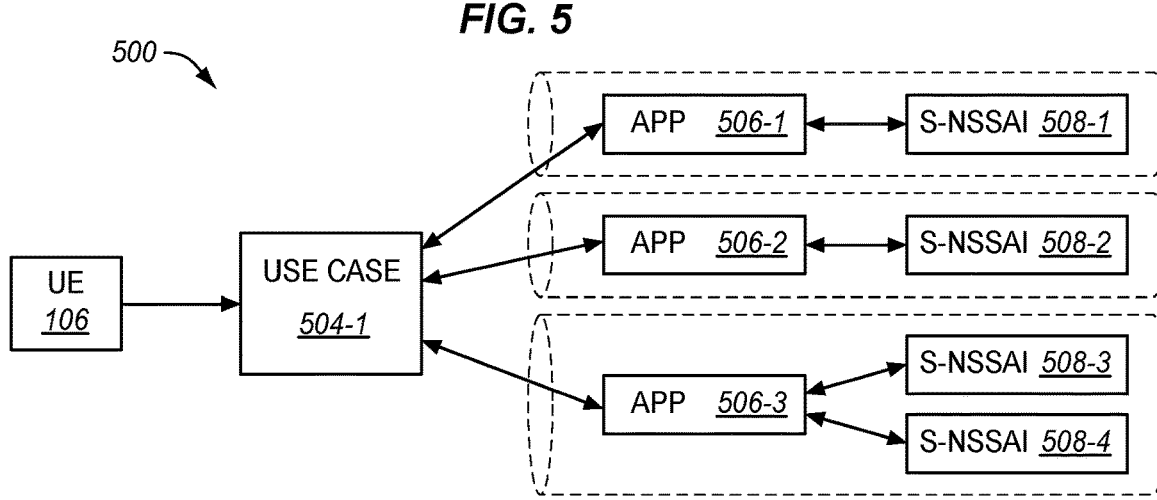
FIGS. 5-7 are schematic diagrams of network slicing matrices in an illustrative embodiment.
Figure 6:
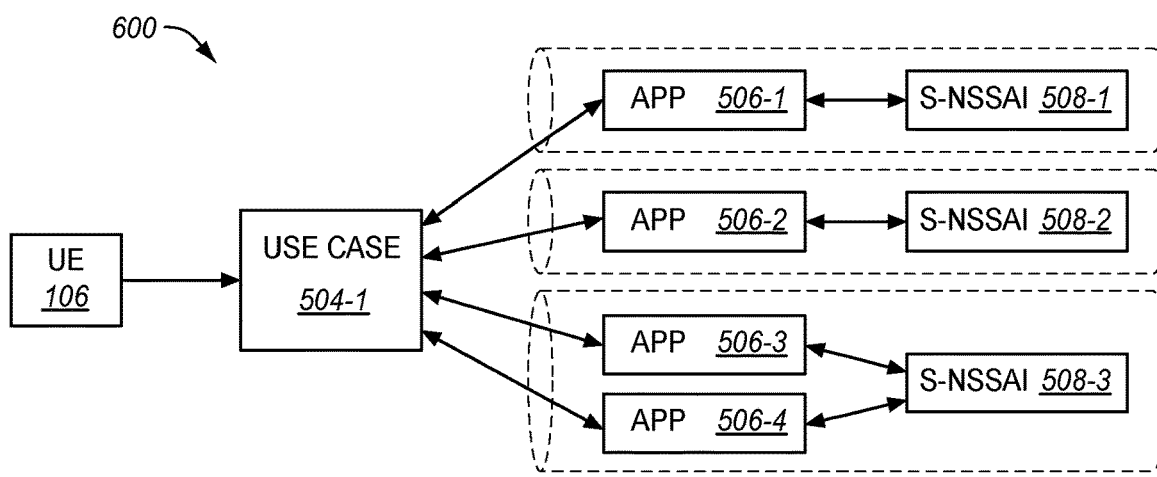
Figure 7:
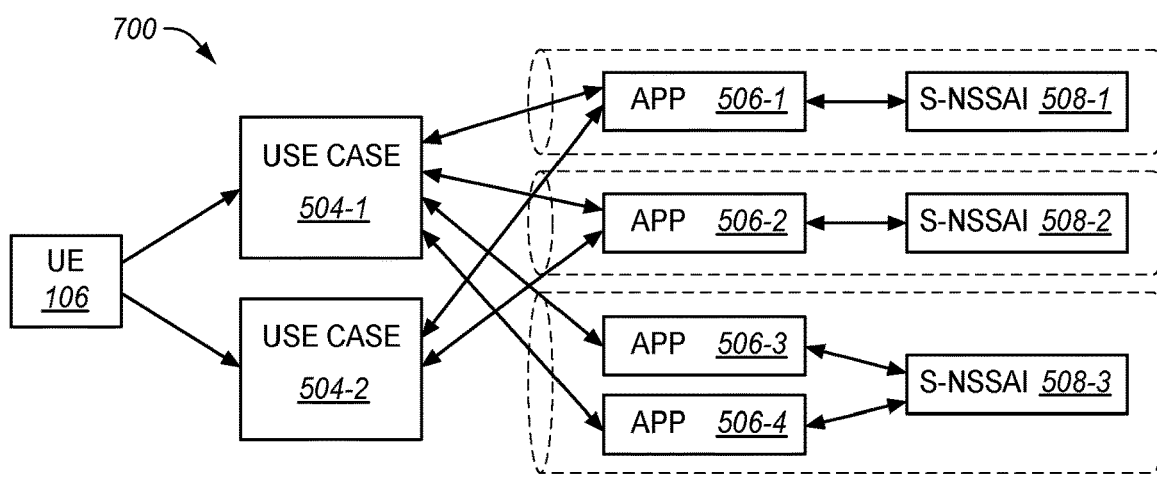

FIGS. 5-7 are schematic diagrams of network slicing matrices in an illustrative embodiment. In FIG. 5, it may be assumed that UE 106 is authorized for use case 504-1. In network slicing matrix 500 of FIG. 5, use case 504-1 (indicated by a use case ID) is mapped to a plurality of applications 506-1 through 506-3. Each of the applications 506 is mapped to one or more network slice identifiers, indicated as S-NSSAIs. For example, application 506-1 is mapped to S-NSSAI 508-1, application 506-2 is mapped to S-NSSAI 508-2, and application 506-3 is mapped to S-NSSAI 508-3 and S-NSSAI 508-4. Thus, use case 504-1 is mapped to four network slices in this example. An S-NSSAI 508 may be comprised of an SST and an SD, or an SST without a standardized SST value and no SD. Instead of being limited to three different SSTs, there may be many more SSTs defined or standardized for the different types of network slices created to provide the services for the different use cases. For example, Table 2 illustrates the SST/SD values for the S-NSSAIs 508.

TABLE 2

| Use Case | Application | S-NSSAI | SST x |
|---|---|---|---|
| 504-1 | 506-1 | 508-1 | SD 1 |
| | Application | S-NSSAI | SST y |
| | 506-2 | 508-2 | SD 1 |
| | Application | S-NSSAI | SST z |
| | 506-3 | 508-3 | SD 1 |
| | Application | S-NSSAI | SST z |
| | 506-3 | 508-4 | SD 2 |

In FIG. 6, it may be assumed that UE 106 is again authorized for use case 504-1. In network slicing matrix 600 of FIG. 6, use case 504-1 (indicated by a use case ID) is mapped to a plurality of applications 506-1 through 506-4, and each of the applications 506 is mapped to one or more network slice identifiers. For example, application 506-1 is mapped to S-NSSAI 508-1, application 506-2 is mapped to S-NSSAI 508-2, and application 506-3 and application 506-4 are mapped to S-NSSAI 508-3. Thus, use case 504-1 is mapped to three network slices in this example. Table 3 illustrates the SST/SD values for the S-NSSAIs 508 in this example.

TABLE 3

| Use Case | Application | S-NSSAI | SST x |
|---|---|---|---|
| 504-1 | 506-1 | 508-1 | SD 1 |
| | Application | S-NSSAI | SST y |
| | 506-2 | 508-2 | SD 1 |
| | Application | S-NSSAI | SST z |
| | 506-3 | 508-3 | SD 1 |
| | Application | S-NSSAI | SST z |
| | 506-4 | 508-3 | SD 1 |

In FIG. 7, it may be assumed that UE 106 is authorized for use cases 504-1 and 504-2. In network slicing matrix 700 of FIG. 7, use case 504-1 (indicated by a use case ID) is mapped to a plurality of applications 506-1 through 506-4, and use case 504-2 is mapped to a plurality of applications 506-1 through 506-2. Each of the applications 506 is mapped to one or more network slice identifiers. For example, application 506-1 is mapped to S-NSSAI 508-1, application 506-2 is mapped to S-NSSAI 508-2, and application 506-3 and application 506-4 are mapped to S-NSSAI 508-3. Thus, use case 504-1 is mapped to three network slices in this example, and use case 504-2 is mapped to two network slices. Table 4 illustrates the SST/SD values for the S-NSSAIs 508 in this example.

TABLE 4

| Use Case | Application | S-NSSAI | SST x |
|---|---|---|---|
| 504-1 | 506-1 | 508-1 | SD 1 |
| | Application | S-NSSAI | SST y |
| | 506-2 | 508-2 | SD 1 |
| | Application | S-NSSAI | SST z |
| | 506-3 | 508-3 | SD 1 |
| | Application | S-NSSAI | SST z |
| | 506-4 | 508-3 | SD 1 |
| Use Case | Application | S-NSSAI | SST x |
| 504-2 | 506-1 | 508-1 | SD 1 |
| | Application | S-NSSAI | SST y |
| | 506-2 | 508-2 | SD 1 |

The network slicing matrices shown in FIGS. 5-7 are just examples, and many more or different matrices may be generated to show the mapping of use cases to network slices for an individual UE or a group of UEs. Additional network slicing matrices may be generated as new e2e use cases are identified.

Table 5 shows an example of a network slicing matrix in industry automation.

TABLE 5

| Use Case | Application | S-NSSAI |
|---|---|---|
| Industry Automation Process | Motion control | S-NSSAI 508-1 |
| | Floor static collaborative cloud robots | S-NSSAI 508-2 |
| | Floor static complex emergency case robots | S-NSSAI 508-2 |
| | Collaborative automated robots | S-NSSAI 508-3 |
| Factory floor critical monitoring sensors | Accurate sensing application | S-NSSAI 508-3 |
| Co-present mixed reality | AR/VR/MR | S-NSSAI 508-4 |

Table 5 is an example illustrating the concept that an individual use case may have one or more applications, and one or multiple applications may be supported with one or more network slices.

Network slicing matrices may be stored or provisioned in a subscriber profile for UE 106 that is maintained by UDM 212 or another database/repository, and may be stored or provisioned in a Universal Integrated Circuit Card (UICC) or the like of UE 106. Each network slicing matrix may be identified with a unique string, label, or other identifier. The network may provision the UICC of UE 106 with one or more network slicing matrices through Over the Air (OTA) updates.

Figure 8:
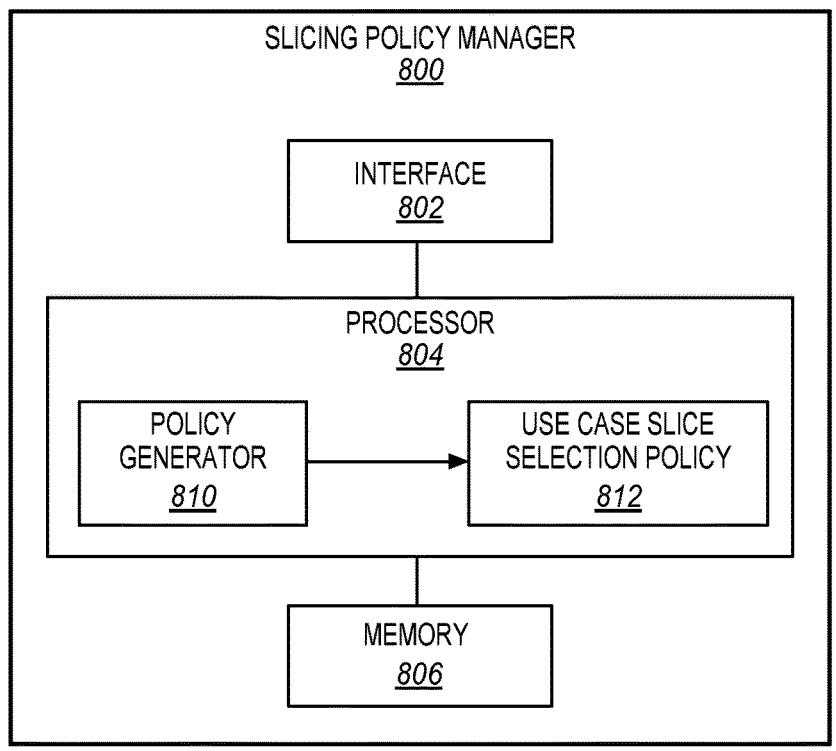
FIG. 8 is a block diagram of a slicing policy manager in an illustrative embodiment.

Network slicing selection for UE 106 takes place in core network 104, and one or more network elements in core network 104 may be involved in the network slicing selection. FIG. 8 is a block diagram of a slicing policy manager 800 in an illustrative embodiment. Slicing policy manager 800 may be implemented in a PCF 218 of a 5G system 100 as illustrated in FIGS. 2-3, or a later generation system. Slicing policy manager 800 is configured to generate or formulate a slice selection policy based on local provisioning and/or input from other network functions, such as UDM 212, a charging system, etc. Slicing policy manager 800 includes an interface component 802, one or more processors 804, and a memory 806. Interface component 802 may comprise circuitry, logic, hardware, means, etc., configured to exchange messages with other network elements or network functions, such as AMF 214, UDM 212, AF 220, NSSF 222, etc. Processor 804 represents circuitry, logic, hardware, means, etc., configured to provide the functions of slicing policy manager 800. Memory 806 is a (non-transitory) computer readable storage medium or means for storing data, instructions, applications, etc., and is accessible by processor 804. Slicing policy manager 800 may include various other components not specifically illustrated in FIG. 8.

Processor 804 may implement a policy generator 810 configured to generate and/or modify a use case slice selection policy 812 for a UE based on local provisioning and/or input from other network functions. The use case slice selection policy 812 includes a set of rules defined or configured to select a network slice from a plurality of network slices for a UE or a session based on use case. Each of the rules in the set may include slice selection criteria and slice selection actions. The following parameters or their combination may be used as the slice selection criteria: use case identifier, performance criteria, terminal type, application type, Time of Day (ToD), Day of Week (DoW), UE/device location, network conditions, network load, charging rate, whether a cloud core network and/or cloud RAN is used, whether an edge cloud is used, eMBB only, URLLC only, eMBB+uRLLC, uRLLC with remote control unit, whether service chain is applied, 5G deployment options (e.g., standalone, non-standalone), capacity/speed, DL/UL throughput, latency, jitter, QoS, mobility, availability, reliability, scalability, coverage and density (Inter-Station Distance), carrier frequency (diverse spectrums: <6 GHz, and mmWave band), aggregated system bandwidth, layout, base antenna elements, UE distribution (density) and UE mobility/speed, traffic model, cycle time, work space (typical and maximum), data package size, parallel active safety services, co-existence of multi-RATs (LTE, 5G NR, Unlicensed), and/or other parameters. The slice selection actions may comprise identifying or providing an identifier (e.g., S-NSSAI) or address of a selected network slice, identifying or providing a list of selected network slices with a priority or preference indication, etc.

Figure 9:
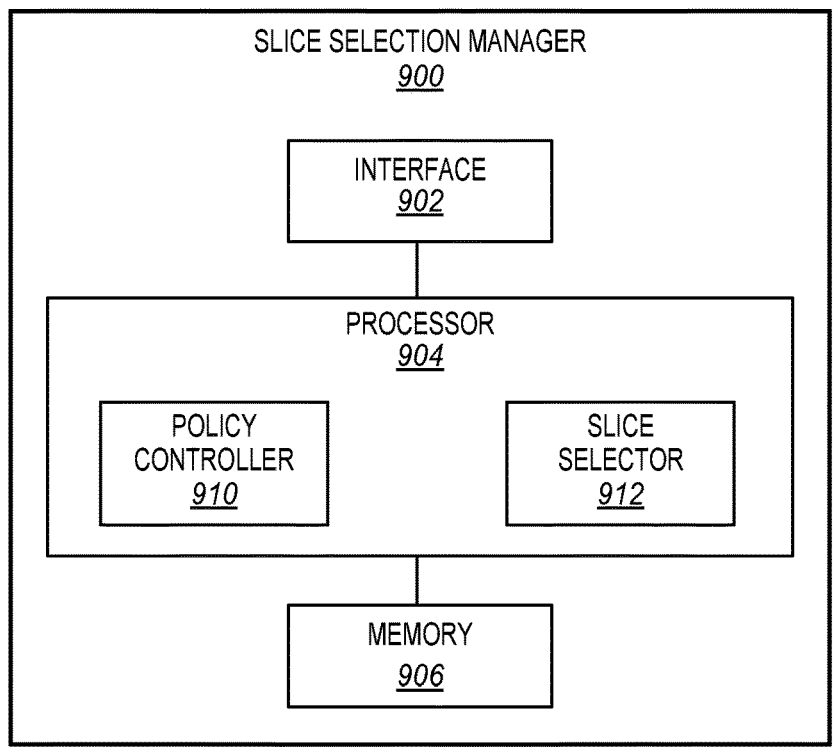
FIG. 9 is a block diagram of a slice selection manager in an illustrative embodiment.

FIG. 9 is a block diagram of a slice selection manager 900 in an illustrative embodiment. Slice selection manager 900 may be implemented in a NSSF 222 of a 5G system 100 as illustrated in FIGS. 2-3, or a later generation system. Slice selection manager 900 is configured to select a network slice for a UE based on a use case slice selection policy and/or other input. In this embodiment, slice selection manager 900 includes an interface component 902, one or more processors 904, and a memory 906. Interface component 902 may comprise circuitry, logic, hardware, means, etc., configured to exchange messages with other network elements or network functions, such as AMF 214, PCF 218, etc. Processor 904 represents circuitry, logic, hardware, means, etc., configured to provide the functions of slice selection manager 900. Memory 906 is a (non-transitory) computer readable storage medium (e.g., ROM or flash memory) or means for storing data, instructions, applications, etc., and is accessible by processor 904. Slice selection manager 900 may include various other components not specifically illustrated in FIG. 9.

Processor 904 may implement a policy controller 910 and a slice selector 912. Policy controller 910 is configured to acquire a use case slice selection policy 812 for a UE from a local cache (e.g., operator-provisioned rules), from slicing policy manager 800 (or PCF 218), or from another server or database. Policy controller 910 may store the use case slice selection policy 812 for a configurable time period, such as in memory 906. Slice selector 912 is configured to select a network slice for a UE or session based on the use case slice selection policy and/or other information.

The following description provides an example of network slice selection based on a use case. As an overview, a UE provides a use case identifier (ID) to the network in a request, such as during a registration procedure, a session establishment procedure, etc. The network generates a use case slice selection policy for the UE, and selects a network slice for the UE based on the use case slice selection policy. Thus, the type of network slice selected for the UE depends on the use case indicated by the UE.

Figure 10:
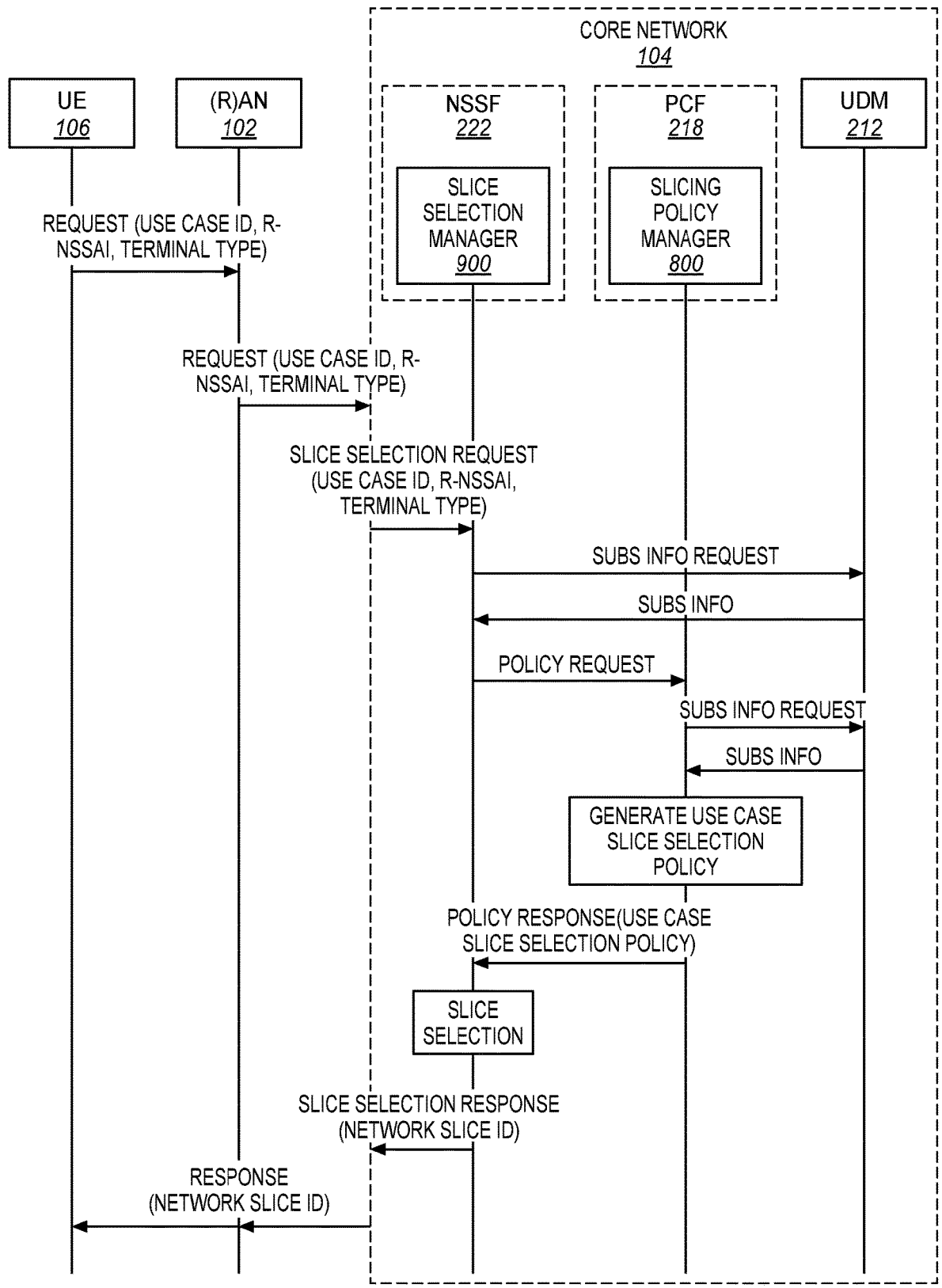
FIG. 10 is a flow diagram illustrating network slice selection for a UE based on a use case in an illustrative embodiment.

FIG. 10 is a flow diagram illustrating network slice selection for UE 106 based on use case in an illustrative embodiment. FIG. 10 shows one example of a flow, and other flows are considered herein. To begin the flow, UE 106 sends a request to (R)AN 102. For example, the request may comprise a registration request for a registration procedure (either initial registration or re-registration) to register UE 106 with core network 104. UE 106 inserts or includes certain information in the request, which is a use case identifier (ID) or multiple use case IDs, a Requested NSSAI(s), and a terminal type. A use case ID uniquely identifies a use case for a PLMN or across multiple PLMNs. The Requested NSSAI(s) contains the S-NSSAI(s) corresponding to the network slice(s) to which UE 106 wishes to register. The terminal type indicates the kind of 5G (or later generation) terminal (i.e., UE 106) that is requesting registration. UE 106 may also insert or include other service information in the request.

(R)AN 102, in response to receiving the request, forwards the request to core network 104. For example, (R)AN 102 may select an AMF 214 based on the (R)AT and the Requested NSSAI, or may select a default AMF 214 if there was no Requested NSSAI present in the request. (R)AN 102 may also select an AMF 214 based on the use case ID.

One or more elements in core network 104 are configured to process the request from UE 106. This embodiment focuses on the functions of core network 104 in selecting one or more network slices for UE 106. Thus, a slice selection request is sent to slice selection manager 900. For example, an AMF 214 may send a slice selection request (e.g., a Nnssf_NSSelection_Get) to slice selection manager 900. The slice selection request may include a Requested NSSAI, Subscribed S-NSSAI(s), the use case ID, and other information. In response to the slice selection request, slice selection manager 900 selects a network slice for UE 106 based on the use case presented by UE 106. Slice selection manager 900 is shown being implemented at NSSF 222 in this embodiment, but may be implemented at another element of a core network in other embodiments.

Figure 11:
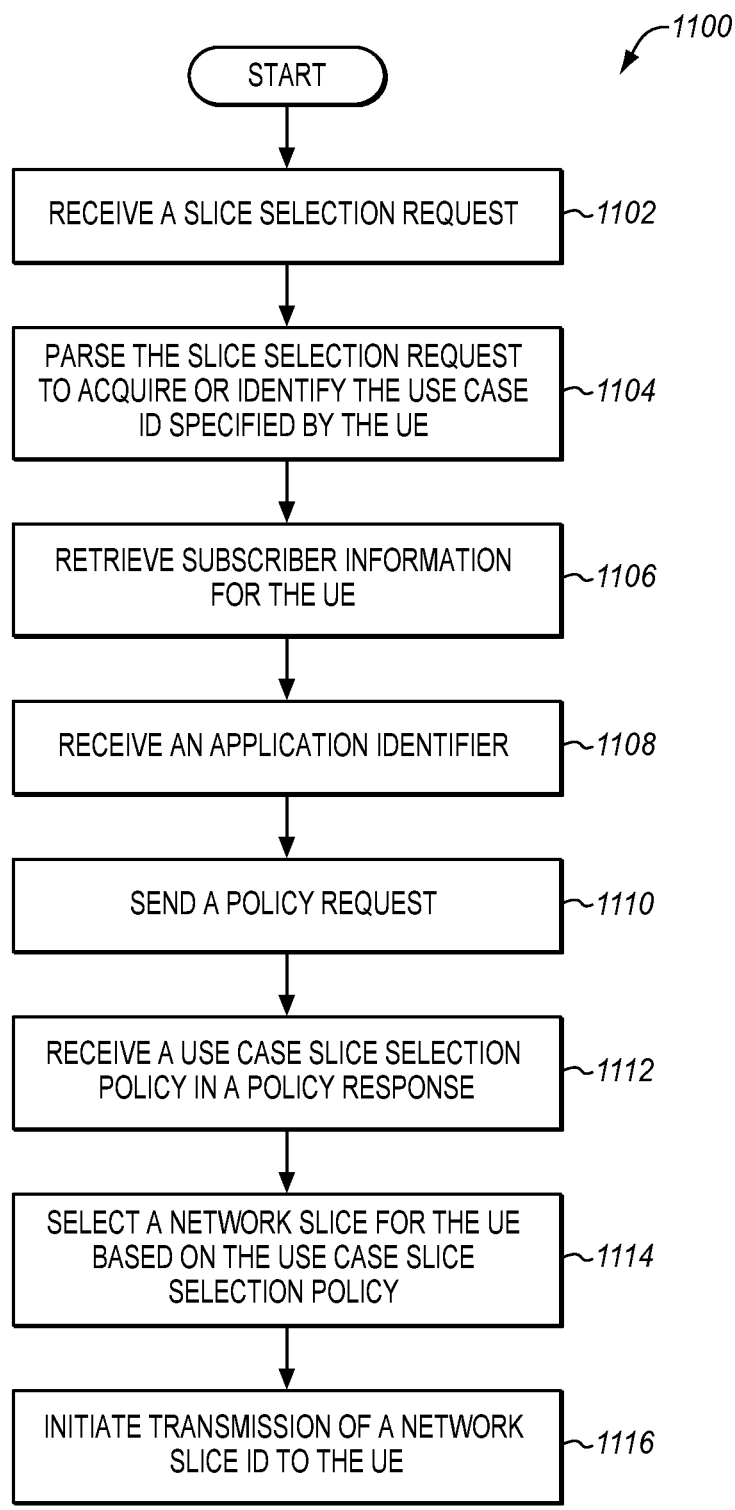
FIG. 11 is a flow chart illustrating a method of selecting a network slice based on a use case in an illustrative embodiment.

FIG. 11 is a flow chart illustrating a method 1100 of selecting a network slice based on a use case in an illustrative embodiment. The steps of method 1100 will be described with reference to slice selection manager 900 in FIG. 9, but those skilled in the art will appreciate that method 1100 may be performed in other devices or network functions.

Slice selector 912 of slice selection manager 900 receives the slice selection request through interface component 902 (step 1102). Slice selector 912 parses the slice selection request to acquire or identify the use case ID specified by UE 106 and other information (step 1104). Slice selector 912 may also obtain other information from other network elements/functions. For instance, slice selector 912 may query UDM 212 or another element/database to retrieve subscriber information for UE 106 (step 1106). Slice selector 912 may also receive an application identifier from AF 220 as shown in FIGS. 2-3 (see step 1108), indicating an application specified for a service requested for UE 106.

In this embodiment, slice selector 912 is configured to select a network slice for UE 106 based on a policy generated by slicing policy manager 800. Thus, policy controller 910 sends a policy request to slicing policy manager 800 through interface component 902 (step 1110). The policy request may include the use case ID, S-NSSAI(s), and terminal type as provided by UE 106. Slicing policy manager 800 may be implemented at PCF 218 as illustrated in FIG. 10. Thus, policy controller 910 may send a Npcf_UEPolicyControl Create Request to slicing policy manager 800 with the use case ID, S-NSSAI(s), and terminal type. However, slicing policy manager 800 may be implemented at another element of a core network in other embodiments. Upon receiving the policy request, slicing policy manager 800 generates a use case slice selection policy for UE 106. A method of generating a use case network slicing policy is shown in FIG. 12.

Figure 12:
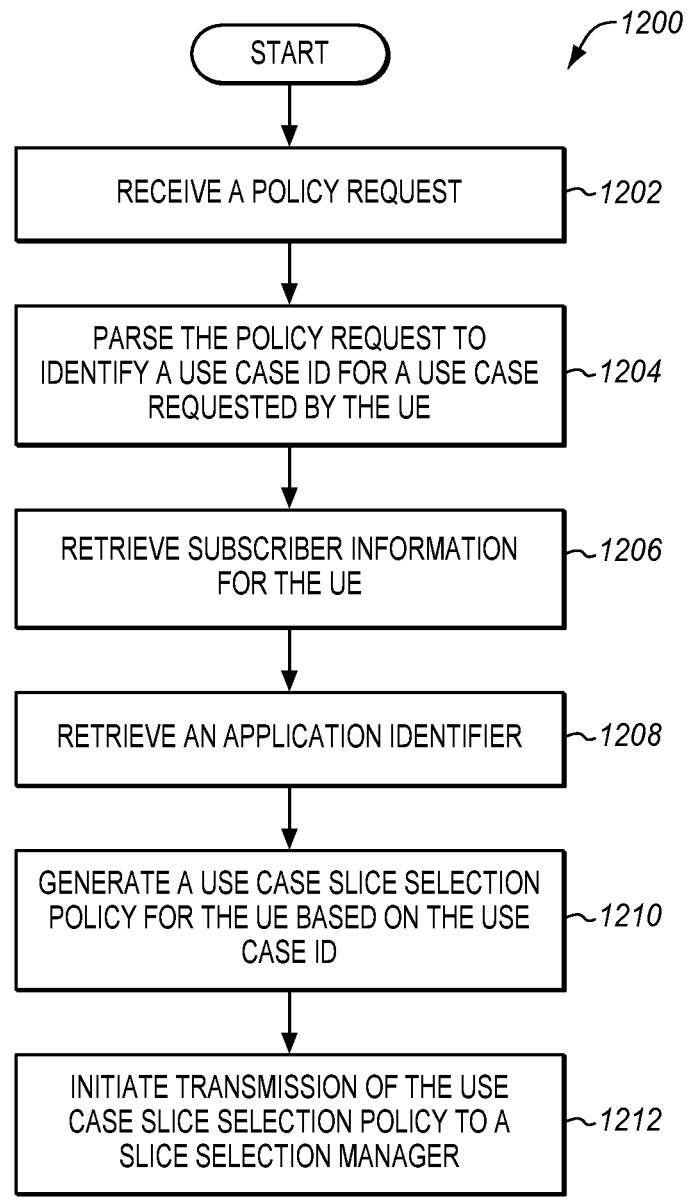
FIG. 12 is a flow chart illustrating a method of generating a use case slice selection policy in an illustrative embodiment.

FIG. 12 is a flow chart illustrating a method 1200 of generating a use case slice selection policy in an illustrative embodiment. The steps of method 1200 will be described with reference to slicing policy manager 800 in FIG. 8, but those skilled in the art will appreciate that method 1200 may be performed in other devices or network functions.

Figure 13:
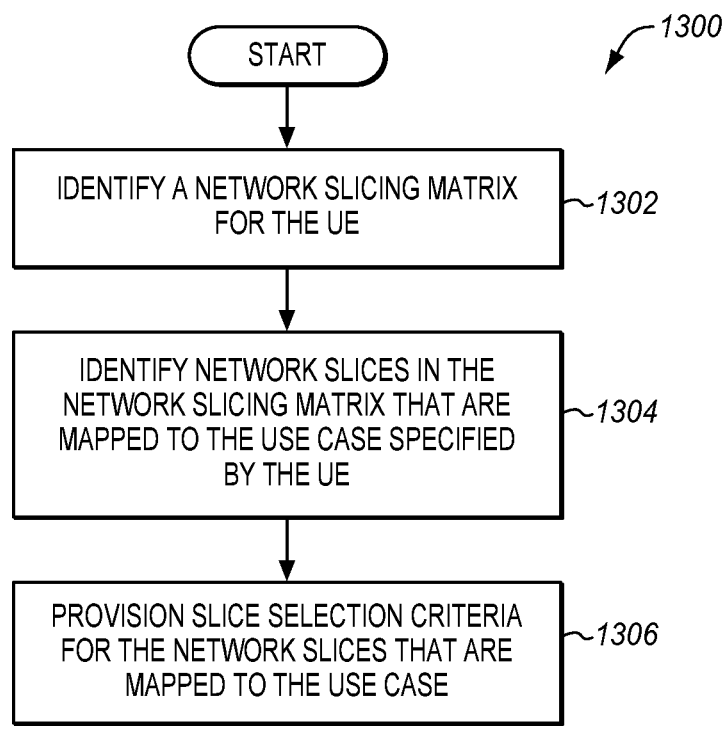
FIG. 13 is a flow chart illustrating a method of generating a use case slice selection policy based on a network slicing matrix in an illustrative embodiment.

Policy generator 810 of slicing policy manager 800 receives the policy request through interface component 802 (step 1202). Policy generator 810 parses the policy request to identify a use case ID for a use case requested by UE 106 (step 1204). Policy generator 810 may also acquire additional information regarding UE 106 and its association with the network. For example, policy generator 810 may query UDM 212 to retrieve subscriber information or a subscriber profile for UE 106 (step 1206), such as by transmitting a subscriber information request as shown in FIG. 10. Policy generator 810 may retrieve (see step 1208) an application identifier from AF 220 (see also, FIGS. 2-3). Policy generator 810 generates a use case slice selection policy 812 for UE 106 based on the use case ID (step 1210). The use case slice selection policy 812 includes rules defined to select a network slice from a plurality of network slices for the use case specified by UE 106. As described above, the rules include slice selection criteria and slice selection actions, and policy generator 810 formulates a policy configured to select the proper network slice for UE 106 based on the specified use case. FIG. 13 is a flow chart illustrating a method 1300 of generating use case slice selection policy 812 based on a network slicing matrix in an illustrative embodiment. Policy generator 810 may process the subscriber profile for UE 106 to identify a network slicing matrix provisioned for UE 106 (step 1302). The network slicing matrix indicates one or more use cases that are authorized for UE 106, and maps the use case(s) to one or more network slices that accommodate the performance requirements of the use case(s). Policy generator 810 may identify the network slices in the network slicing matrix that are mapped to the use case specified by UE 106 (step 1304). Policy generator 810 then provisions slice selection criteria for the network slices that are mapped to the use case (step 1306). For example, the slice selection criteria may include location of UE 106, network conditions, network load, charging rate, etc., that are provisioned for each of the network slices that are mapped to the use case. Thus, a network slice from a network slicing matrix may be selected by slice selection manager 900 based on the slice selection criteria provisioned for the network slices in the policy.

In FIGS. 10 and 12, policy generator 810 initiates transmission a policy response to slice selection manager 900 through interface component 802 (step 1212), that includes the use case slice selection policy 812. Policy generator 810 may also send the use case slice selection policy 812 to other network elements/functions as desired, such as an AMF 214.

In FIG. 11, policy controller 910 of slice selection manager 900 receives the policy response from slicing policy manager 800 through interface component 902 (step 1112), which includes the use case slice selection policy 812. Slice selector 912 of slice selection manager 900 selects a network slice for UE 106 based on the use case slice selection policy 812 (step 1114). For example, slice selector 912 may parse the use case slice selection policy 812 to identify the slice selection criteria provisioned for the network slices authorized for UE 106. When the slice selection criteria is met based on conditions for core network 104, (R)AN 102, UE 106, etc., slice selector 912 selects the appropriate network slice for UE 106. In some embodiments, slice selector 912 may select a list of network slices for UE 106 along with priority or preference indication. Slice selector 912 then initiates transmission of a network slice ID (e.g., S-NSSAI or NSI-ID) to UE 106 through interface component 902 (step 1116). For example, slice selector 912 may send a slice selection response to AMF 214 or another intermediate element in core network 104 that forwards the response to UE 106 with the network slice ID. UE 106 therefore receives a response (e.g., a registration complete) from core network 104 with the network slice ID selected for the use case specified by UE 106. Slice selector 912 may also update subscriber information in UDM 212 with the use case slice selection policy 812.

Upon receiving the response from core network 104, UE 106 may accept network slice selected by the network based on the use case, or may request a new network slice. UE 106 is configured to evaluate whether the network slice received from the network meets its needs, such as performance level, battery saving, charging rate, etc. If UE 106 requires a certain type of network slice to meet the use case requirements and that type of network slice does not exist, then the network may fail a registration request (if attempted) since the use case requirement cannot be met, and a request may be sent to the orchestrator to instantiate a new network slice. The network may send the information back to UE 106 so that UE 106 may reinitiate a request (e.g., a registration request).

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. A system comprising:
a slicing policy manager implemented in a network that provides one or more services to User Equipment (UE), wherein the network is partitioned into a plurality of network slices;
the slicing policy manager comprising at least one processor and at least one memory that cause the slicing policy manager to:
receive a policy request for the UE;
identify a use case identifier in the policy request that indicates a use case specified by the UE;
generate a use case slice selection policy configured to select a network slice from the plurality of network slices based on the use case specified by the UE; and
initiate transmission of the use case slice selection policy to a slice selection manager.

2. The system of claim 1 wherein the at least one processor and the at least one memory cause the slicing policy manager to:
retrieve a subscriber profile for the UE;
process the subscriber profile to identify a network slicing matrix provisioned for the UE, wherein the network slicing matrix maps one or more use cases authorized for the UE to one or more of the plurality of network slices that accommodate performance requirements of the one or more use cases; and
generate the use case slice selection policy based on the use case and the network slicing matrix.

3. The system of claim 2 wherein the at least one processor and the at least one memory cause the slicing policy manager to:
identify the network slices in the network slicing matrix that are mapped to the use case specified by the UE; and
provision slice selection criteria for the network slices that are mapped to the use case specified by the UE to generate the use case slice selection policy.

4. The system of claim 2 wherein:
for each use case of the one or more use cases, the network slicing matrix maps the use case to one or more applications; and
the network slicing matrix maps one or more of the plurality of network slices to each of the applications.

5. The system of claim 1 further comprising at least one processor and at least one memory that cause the slice selection manager to:
receive the use case slice selection policy from the slicing policy manager;
select a network slice for the UE from the plurality of network slices based on the use case slice selection policy; and
initiate transmission of a network slice identifier for the selected network slice to the UE.

6. The system of claim 5 wherein:
the slicing policy manager is implemented at a Policy Control Function (PCF); and
the slice selection manager is implemented at a Network Slice Selection Function (NSSF).

7. The system of claim 1 further comprising circuitry that causes the UE to:
insert the use case identifier in a registration request sent to the network.

8. A method of operating a network that provides one or more services to User Equipment (UE), wherein the network is partitioned into a plurality of network slices, the method comprising:
receiving a policy request for the UE at a slicing policy manager;
identifying, at the slicing policy manager, a use case identifier in the policy request that indicates a use case specified by the UE;
generating, at the slicing policy manager, a use case slice selection policy configured to select a network slice from the plurality of network slices based on the use case specified by the UE; and initiating transmission of the use case slice selection policy from the slicing policy manager to a slice selection manager.

9. The method of claim 8 further comprising:

retrieving, at the slicing policy manager, a subscriber profile for the UE; and processing, at the slicing policy manager, the subscriber profile to identify a network slicing matrix provisioned for the UE, wherein the network slicing matrix maps one or more use cases authorized for the UE to one or more of the plurality of network slices that accommodate performance requirements of the one or more use cases;

wherein generating the use case slice selection policy comprises generating the use case slice selection policy based on the use case and the network slicing matrix.

10. The method of claim 9 wherein generating the use case slice selection policy comprises:

identifying the network slices in the network slicing matrix that are mapped to the use case specified by the UE; and provisioning slice selection criteria for the network slices that are mapped to the use case specified by the UE to generate the use case slice selection policy.

11. The method of claim 9 wherein:

for each use case of the one or more use cases, the network slicing matrix maps the use case to one or more applications; and the network slicing matrix maps one or more of the plurality of network slices to each of the applications.

12. The method of claim 8 further comprising:

receiving, at the slice selection manager, the use case slice selection policy from the slicing policy manager;

selecting, at the slice selection manager, a network slice for the UE from the plurality of network slices based on the use case slice selection policy; and initiating transmission of a network slice identifier for the selected network slice from the slice selection manager to the UE.

13. The method of claim 12 wherein:

the slicing policy manager is implemented at a Policy Control Function (PCF); and the slice selection manager is implemented at a Network Slice Selection Function (NSSF).

14. The method of claim 8 further comprising:

inserting, at the UE, the use case identifier in a registration request sent to the network.

15. A non-transitory computer readable medium embodying programmed instructions executed by one or more processors, wherein the instructions direct the processors to implement:

a slicing policy manager implemented in a network that provides one or more services to User Equipment (UE), wherein the network is partitioned into a plurality of network slices;

the slicing policy manager operates to:

receive a policy request for the UE;

identify a use case identifier in the policy request that indicates a use case specified by the UE;

generate a use case slice selection policy configured to select a network slice from the plurality of network slices based on the use case specified by the UE; and initiate transmission of the use case slice selection policy to a slice selection manager.

16. The computer readable medium of claim 15 wherein the slicing policy manager operates to:

retrieve a subscriber profile for the UE;

process the subscriber profile to identify a network slicing matrix provisioned for the UE, wherein the network slicing matrix maps one or more use cases authorized for the UE to one or more of the plurality of network slices that accommodate performance requirements of the one or more use cases; and generate the use case slice selection policy based on the use case and the network slicing matrix.

17. The computer readable medium of claim 16 wherein the slicing policy manager operates to:

identify the network slices in the network slicing matrix that are mapped to the use case specified by the UE; and provision slice selection criteria for the network slices that are mapped to the use case specified by the UE to generate the use case slice selection policy.

18. The computer readable medium of claim 16 wherein:

for each use case of the one or more use cases, the network slicing matrix maps the use case to one or more applications; and the network slicing matrix maps one or more of the plurality of network slices to each of the applications.

19. The computer readable medium of claim 15 wherein:

the slicing policy manager is implemented at a Policy Control Function (PCF).

20. The computer readable medium of claim 19 wherein:

the slice selection manager is implemented at a Network Slice Selection Function (NSSF).

* * * * *